United States Patent
Miyamoto et al.

(10) Patent No.: US 10,459,846 B2
(45) Date of Patent: Oct. 29, 2019

(54) MEMORY SYSTEM WHICH USES A HOST MEMORY

(71) Applicant: Toshiba Memory Corporation, Tokyo (JP)

(72) Inventors: Yukimasa Miyamoto, Yokohama (JP); Toru Katagiri, Sagamihara (JP); Shoji Sawamura, Yokohama (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 421 days.

(21) Appl. No.: 15/065,535

(22) Filed: Mar. 9, 2016

(65) Prior Publication Data

US 2017/0075815 A1 Mar. 16, 2017

Related U.S. Application Data

(60) Provisional application No. 62/216,854, filed on Sep. 10, 2015.

(51) Int. Cl.
  *G06F 12/1009* (2016.01)
  *G06F 3/06* (2006.01)

(52) U.S. Cl.
  CPC ........ *G06F 12/1009* (2013.01); *G06F 3/0619* (2013.01); *G06F 3/0659* (2013.01); *G06F 3/0685* (2013.01); *G06F 2212/65* (2013.01)

(58) Field of Classification Search
  CPC .. G06F 12/1009; G06F 3/0685; G06F 3/0619; G06F 3/0659; G06F 2212/65
  See application file for complete search history.

(56) References Cited

U.S. PATENT DOCUMENTS

| | | | | |
|---|---|---|---|---|
| 5,802,069 A | * | 9/1998 | Coulson | G06F 3/0601 714/6.13 |
| 6,000,006 A | * | 12/1999 | Bruce | G06F 11/1068 711/103 |
| 2008/0189485 A1 | * | 8/2008 | Jung | G06F 12/0246 711/115 |
| 2009/0157949 A1 | * | 6/2009 | Leibowitz | G06F 12/0246 711/103 |

(Continued)

FOREIGN PATENT DOCUMENTS

| | | |
|---|---|---|
| JP | 05-250251 A | 9/1993 |
| JP | 3271668 B2 | 1/2002 |
| JP | 2011-008824 A | 1/2011 |

*Primary Examiner* — Rocio Del Mar Perez-Velez
(74) *Attorney, Agent, or Firm* — Oblon, McClelland, Maier & Neustadt, L.L.P.

(57) ABSTRACT

According to one embodiment, a memory system is connectable to a host device including a first memory. The memory system includes a memory controller and a second memory in which data from a host device is stored. The memory controller includes a third memory, a first unit and a second unit and has a first space. The first unit designates a first address in the first space. The second unit converts, by using a conversion table, the first address into a second address in a first area of the first memory. The conversion table includes a plurality of layers and includes a first conversion table of a top layer and a second conversion table of a layer lower than the first conversion table. The first conversion table is stored in the third memory. The second conversion table is stored in a second area of the first memory.

18 Claims, 12 Drawing Sheets

(56) References Cited

U.S. PATENT DOCUMENTS

| | | | |
|---|---|---|---|
| 2010/0250836 A1* | 9/2010 | Sokolov | G06F 12/0246 711/103 |
| 2010/0312947 A1* | 12/2010 | Luukkainen | G06F 12/0223 711/103 |
| 2012/0072644 A1* | 3/2012 | Asano | G06F 12/0246 711/103 |
| 2013/0191609 A1* | 7/2013 | Kunimatsu | G06F 12/10 711/203 |
| 2014/0208062 A1* | 7/2014 | Cohen | G06F 3/0608 711/206 |
| 2015/0177986 A1* | 6/2015 | Kondo | G06F 13/385 711/103 |
| 2016/0026406 A1* | 1/2016 | Hahn | G06F 3/0631 711/103 |
| 2016/0274797 A1* | 9/2016 | Hahn | G06F 3/0605 |
| 2017/0357572 A1* | 12/2017 | Okubo | G06F 12/0246 |

* cited by examiner

FIG.2

| SIZE INFORMATION | SECOND ADDRESS |
|---|---|
| 1 | HADDR 0 |
| 3 | HADDR 1 |
| 2 | HADDR 2 |

FIG.10

| SIZE INFORMATION | SECOND ADDRESS |
|---|---|
| 1 | HADDR 0 |
| 13 | HADDR 1 |
| 45 | HADDR 2 |
| 5 | HADDR 3 |
| ⋮ | ⋮ |
| 10 | HADDR 35 |
| ⋮ | ⋮ |
| 29 | HADDR 44 |

| SECOND ADDRESS | Valid | ENTRY NUMBER |
|---|---|---|
| HADDR 0 | 1 | 0 |
| HADDR 1 | 1 | 1 |
|  | 0 | 2 |

FIG.12

| SECOND ADDRESS | Valid | ENTRY NUMBER | |
|---|---|---|---|
| HADDR 1+4KB | 1 | 0 | ⎫ |
| HADDR 1+8KB | 1 | 1 | ⎪ |
| HADDR 1+12KB | 1 | 2 | ⎬ STORE ENTRIES IN PAGE LOCATED AT HADDR 0 |
| HADDR 1+16KB | 1 | 3 | ⎪ |
| ⋮ | ⋮ | ⋮ | ⎪ |
| HADDR 35 | 1 | 499 | ⎭ |
| HADDR 35+4KB | 1 | 510 | ⎫ |
| HADDR 35+8KB | 1 | 511 | ⎪ |
| HADDR 35+12KB | 1 | 512 | ⎬ STORE ENTRIES IN PAGE LOCATED AT HADDR 1 |
| ⋮ | ⋮ | ⋮ | ⎪ |
| HADDR 44+112KB | 1 | 697 | ⎪ |
|  | 0 | 698 | ⎭ |

121b

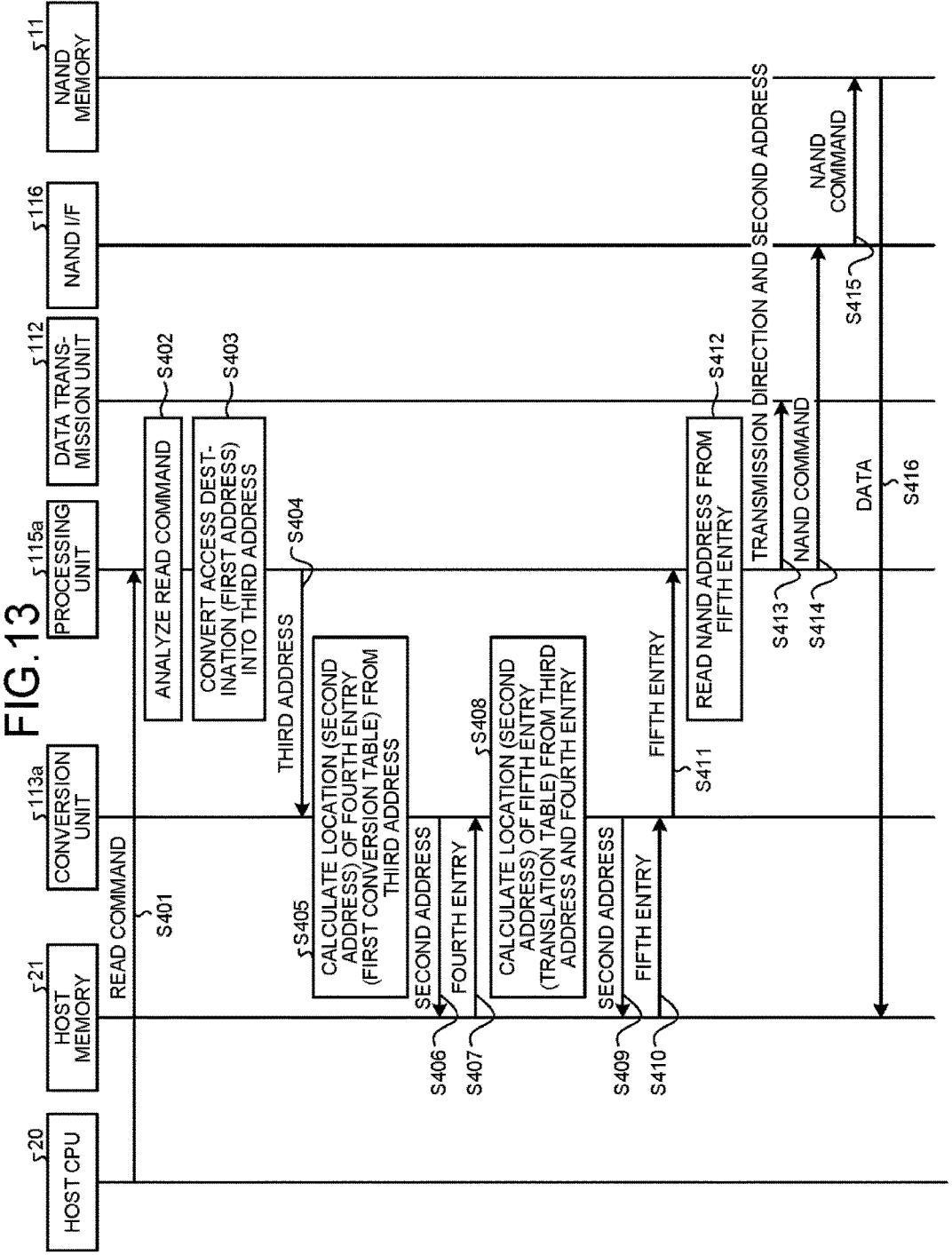

MEMORY SYSTEM WHICH USES A HOST MEMORY

CROSS-REFERENCE TO RELATED APPLICATIONS

This application is based upon and claims the benefit of priority from U.S. Provisional Application No. 62/216,854, filed on Sep. 10, 2015; the entire contents of which are incorporated herein by reference.

FIELD

Embodiments described herein relate generally to a memory system and an information processing apparatus.

BACKGROUND

In recent years, there has been a memory system that is connected to a host and can use a memory (host memory) in the host.

BRIEF DESCRIPTION OF THE DRAWINGS

FIG. 2 is a diagram illustrating an example of the data structure of a descriptor list;

FIG. 10 is a diagram illustrating an example of a descriptor list;

FIG. 11 is a diagram illustrating an example of a first conversion table;

FIG. 12 is a diagram illustrating an example of a second conversion table; and

FIG. 13 is a sequence diagram illustrating processing for an access command in the second embodiment.

DETAILED DESCRIPTION

In general, according to one embodiment, a memory system is connectable to a host device including a first memory. The memory system includes a memory controller and a second memory in which data from the host device is stored. The second memory is a non-volatile memory. The memory controller includes a third memory which is a volatile memory, controls the second memory and the third memory, and has a first space. The memory controller includes a first unit and a second unit. The first unit designates a first address which is an address in the first space. The second unit converts, by using a conversion table, the first address into a second address indicating a location in a first area of the first memory. The second unit transmits the second address to the host device to access the first area. The conversion table is divided into a plurality of layers and includes a first conversion table which is a table in a top layer and a second conversion table which is a table in a layer lower than the first conversion table. The first conversion table is stored in the third memory. The second conversion table is stored in a second area of the first memory.

Exemplary embodiments of a memory system and an information processing apparatus will be explained below in detail with reference to the accompanying drawings. The present invention is not limited to the following embodiments.

First Embodiment

Figure 1:
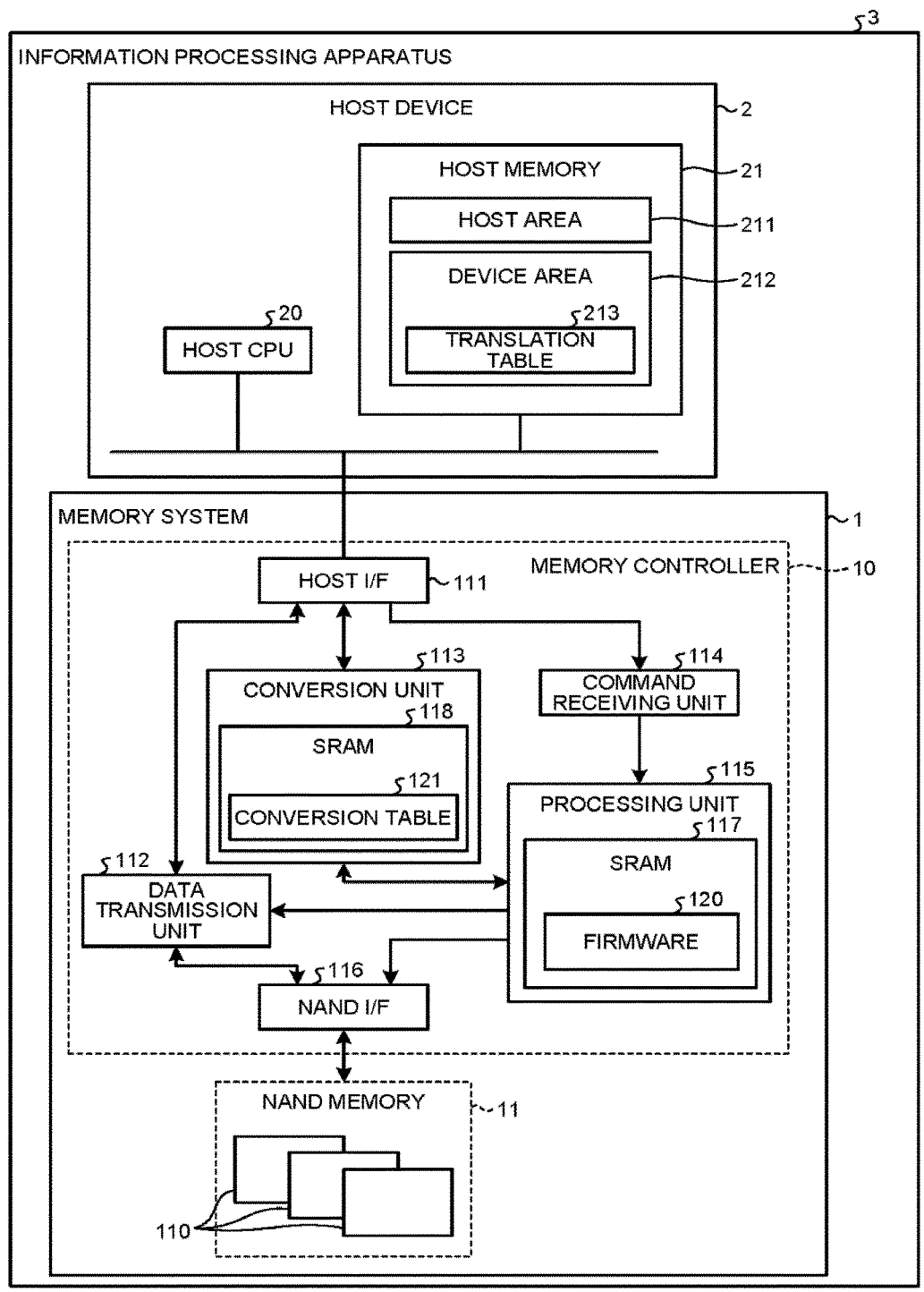
FIG. 1 is a diagram illustrating an example of the structure of a memory system according to a first embodiment.

FIG. 1 is a diagram illustrating an example of the structure of a memory system according to a first embodiment. A memory system 1 is connected to a host device 2. The memory system 1 and the host device 2 form an information processing apparatus 3 according to the first embodiment. The host device 2 is, for example, a computer. The computer includes, for example, a server, a personal computer, a portable computer, or a portable communication device. The memory system 1 functions as an external storage device of the host device 2. In the following description, the memory system 1 is based on an NVM Express standard. Any standard which can be used by a host memory (a host memory 21 which will be described below) of the host device 2 can be used as the standard of the memory system 1. The memory system 1 and the host device 2 are connected to each other by a communication path which is based on a standard corresponding to the standard of the memory system 1. For example, in a case where the memory system 1 is based on the NVM Express standard, the memory system 1 and the host device 2 are connected to each other through a communication path based on a PCI Express standard.

The host device 2 includes at least a host central processing unit (CPU) 20 and the host memory 21. The host CPU 20 and the host memory 21 are connected to each other by a bus. The memory system 1 is connected to the bus.

The host memory 21 has a large capacity and the host CPU 20 can access the host memory 21 at a high speed. Any kind of memory can be employed as the host memory 21. The host memory 21 is, for example, a dynamic random access memory (DRAM). The host memory 21 may be a volatile memory or a non-volatile memory.

A host area 211 which is used by the host CPU 20 and a device area 212 which can be used by the memory system 1 are allocated in the host memory 21.

The host area 211 is used as an area in which data is temporarily or non-temporarily stored, a work area, or an area to which a program is loaded.

Any data can be stored in the device area 212. In this embodiment, for example, a translation table 213 is stored in the device area 212. The translation table 213 is information in which the relation between locational information indicating a location in a first space and locational information indicating a physical location in a NAND memory 11 (which will be described below) is recorded. The locational information indicating the physical location in the NAND memory 11 is referred to as a NAND address.

The first space is an address space which is used by the host device 2 to access the memory system 1. The host device 2 can designate the location of data in the memory system 1, using the locational information indicating the location in the first space. The locational information indicating the location in the first space is represented in, for example, a logical block address (LBA) format. The first space is an address space different from a second space and a third space. The second space is an address space which is used in the bus of the host device 2. The host memory 21 is mapped to the second space. That is, a location in the host area 211 and a location in the device area 212 can be designated by locational information indicating a location in the second space in the bus. The third space is an address space which is used in a memory controller 10. Specifically, the third space is an address space to which a memory area (a memory, a buffer, or a register) of the memory controller 10 is mapped. Each component of the memory controller 10 can designate each location in the memory area of the memory controller 10, using the third space.

Hereinafter, locational information indicating a location in an n-th space is simply referred to as an n-th address. The location in the n-th space can be designated by the n-th address.

As described above, each location in the device area 212 can be designated by a second address in the bus of the host device 2. In addition, the device area 212 is mapped to the third space through the second address. The relation between the second address and the third address of each location in the device area 212 is recorded in a conversion table 121 which will be described below. The memory system 1 manages the location of data in the device area 212, using the conversion table 121.

The host CPU 20 can issue an access command to the memory system 1. The access command includes a read command and a write command. The access command includes a first address and a second address. Specifically, the second address included in the access command indicates a location in the host area 211. The first address included in the access command indicates a location in the memory system 1. In the case of the read command, the first address indicates the transmission source of data and the second address indicates the transmission destination of data. In the case of the write command, the second address indicates the transmission source of data and the first address indicates the transmission destination of data.

The host CPU 20 allocates the device area 212 in the host memory 21 when the memory system 1 starts. Then, the host CPU 20 transmits a host memory descriptor list 300 (hereinafter, simply referred to as a descriptor list 300) to the memory system 1. The descriptor list 300 is information for notifying the memory system 1 of an area which is allocated as the device area 212 among areas in the host memory 21. The memory system 1 can use the area which is designated by the descriptor list 300.

FIG. 2 is a diagram illustrating an example of the data structure of the descriptor list 300. Each entry of the descriptor list 300 includes the second address and size information. The host CPU 20 manages each unit area with a certain size in the host memory 21. In this example, the size of the unit area is 4 Kbyte. The size of the unit area is defined by, for example, an operating system of the host device 2. The unit area is also referred to as a page. The device area 212 includes one or more pages. For example, the size information included in each entry of the descriptor list 300 is represented by the number of one or more pages whose locations are continuous. For example, in the descriptor list 300 illustrated in FIG. 2, one entry in which "HADDR X" is recorded as the second address and HY" is recorded as the size information means that "Y" pages which are located in a size range corresponding to "Y" pages having "HADDR X" as the head form the device area 212. In addition, since the descriptor list 300 has a plurality of entries, the device area 212 can be formed by a plurality of pages which are located at discontinuous locations.

The memory system 1 includes the memory controller 10 and the NAND memory 11.

The NAND memory 11 is a NAND flash memory which is used as a storage. The NAND memory 11 can store data transmitted from the host device 2. The NAND memory 11 includes one or more memory chips 110. Each memory chip 110 has a NAND memory cell array. Each memory cell array includes a plurality of blocks. The block is the minimum unit of erasing. The type of memory which is used as the storage is not limited to the NAND flash memory. Any memory can be used as the storage as long as it is a non-volatile memory. For example, a NOR flash memory can be used as the storage.

The memory controller 10 performs data transmission between the host device 2 and the NAND memory 11. The memory controller 10 includes a host I/F 111, a data transmission unit 112, a conversion unit 113, a command receiving unit 114, a processing unit 115, and a NAND I/F 116. Some or all of the host I/F 111, the data transmission unit 112, the conversion unit 113, the command receiving unit 114, the processing unit 115, and the NAND I/F 116 can be formed by software, hardware, or a combination thereof. Each of the host I/F 111, the data transmission unit 112, the conversion unit 113, the command receiving unit 114, the processing unit 115, and the NAND I/F 116 can be formed by two or more units. Two or more of the host I/F 111, the data transmission unit 112, the conversion unit 113, the command receiving unit 114, the processing unit 115, and the NAND I/F 116 can be formed by one unit.

The host I/F 111 is an interface device for connection to the host device 2. For example, the host I/F 111 is based on the PCI Express standard. The NAND I/F 116 is an interface device for connection to the NAND memory 11.

The data transmission unit 112 performs data transmission between the host area 211 and the NAND memory 11 through the host I/F 111 and the NAND I/F 116. The data transmission unit 112 includes, for example, a direct memory access (DMA) controller. The data transmission unit 112 is supplied with a data transmission direction and the locational information in the host area 211 from the processing unit 115. In addition, the locational information in the host area 211 which is supplied from the processing unit 115 is represented by the second address. For example, the processing unit 115 supplies the second address included in the access command to the data transmission unit 112.

The command receiving unit 114 receives the access command issued by the host CPU 20. For example, the host CPU 20 stores the access command in the host area 211 and notifies the memory system 1 that the access command has been stored in the host area 211. The host CPU 20 may form a command queue for queuing the access command in the host area 211. The command receiving unit 114 acquires the access command stored in the host area 211 in response to the notice. The command receiving unit 114 transmits the acquired access command to the processing unit 115.

The processing unit 115 controls the memory controller 10. The processing unit 115 includes a static random access memory (SRAM) 117 as a small-scale memory which stores various kinds of data for various processes. The SRAM 117 stores, for example, firmware 120 which is a program for implementing the processes. The processing unit 115 executes the firmware 120 to implement various processes.

The processing unit 115 generates the conversion table 121 on the basis of the descriptor list 300. The processing unit 115 transmits the generated conversion table 121 to the conversion unit 113. As described above, the conversion table 121 is information in which the second address indicating each location in the device area 212 is associated with the third address used in the memory controller 10. Since the conversion table 121 is provided in the memory controller 10, the memory controller 10 can use data in the device area 212, using the third address. The term "use" includes reference, update, deletion, or generation.

As described above, according to the embodiment, the translation table 213 is stored in the device area 212. According to the embodiment, the memory controller 10 acquires a NAND address from the first address included in the access command through conversion using the conversion table 121 and translation using the translation table 213.

Figure 3:
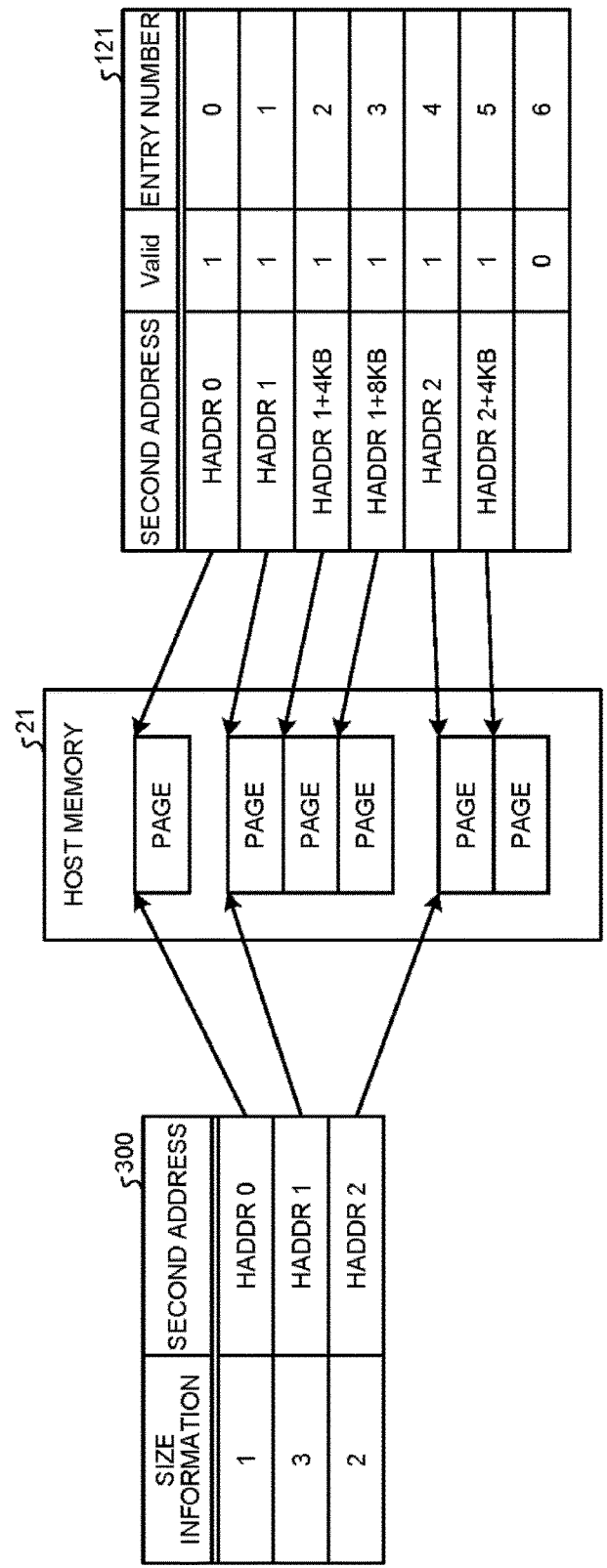
FIG. 3 is a diagram illustrating the relationship between the descriptor list and a conversion table.

FIG. 3 is a diagram illustrating the relationship between the descriptor list 300 and the conversion table 121. In the descriptor list 300, one entry can indicate an area which is formed by a plurality of pages. In contrast, in an address conversion table, one entry indicates one page. In other words, the size of the area indicated by each entry of the conversion table 121 is fixed to one page. Each entry of the conversion table 121 includes the second address indicating the location of the head of the page and a valid flag. An index of the conversion table 121 corresponds to an entry number. The valid flag indicates whether the entry is valid. Here, "1" is recorded in the valid flag of a valid entry and "0" is recorded in the valid flag of an invalid entry. For example, the order of each entry in the conversion table 121 corresponds to the order of each entry in the descriptor list 300. In the example illustrated in FIG. 3, in the descriptor list 300, an area with a size of one page having "HADDR 0" at the head, an area with a size of three pages having "HADDR 1" at the head, and an area with a size of two pages having "HADDR 2" at the head are allocated as the device area 212 in this order. In the conversion table 121, pages which are located at "HADDR 0", "HADDR 1", "HADDR 1+4 Kbyte", "HADDR 1+8 Kbyte", "HADDR 2", and "HADDR 2+4 Kbyte" are allocated as the device area 212 in this order.

One or more continuous or discontinuous pages which are allocated as the device area 212 are associated with a continuous area in the third space by the conversion table 121. Therefore, the memory controller 10 becomes to be able to treat one or more continuous or discontinuous pages, which are allocated as the device area 212, as a continuous area obtained by virtually combining the pages in the order recorded in the conversion table 121. After generating the conversion table 121, the processing unit 115 stores the translation table 213 in the areas which are connected by the conversion table 121. The translation table 213 includes one or more entries and NAND addresses are recorded in one or more entries of the translation table 213. One or more entries of the translation table 213 are sequentially stored in the order of the first addresses corresponding to the order of the areas, which are connected by the conversion table 121, from the top. In addition, one entry of the translation table may be used for each block of some continuous first addresses (for example, each block of eight first addresses).

The processing unit 115 calculates locational information indicating the location of a first entry among one or more entries of the conversion table 121 from the first address in the access command. The location indicated by the first entry is represented by the third address. That is, the processing unit 115 converts the first address into the third address. The first entry indicates the location of the head of the page in which a second entry is stored. The second entry is an entry in which a NAND address corresponding to the first address in the access command among one or more entries of the translation table 213 is recorded.

The relation between the first address included in the access command and the third address indicating the location of the first entry is predetermined by the firmware 120. For example, the conversion table 121 is arranged in one continuous range of the third space. Then, the processing unit 115 adds the first address included in the access command as an offset to locational information indicating a starting point of the range in the third space to acquire the third address indicating the location of the first entry.

Figure 4:
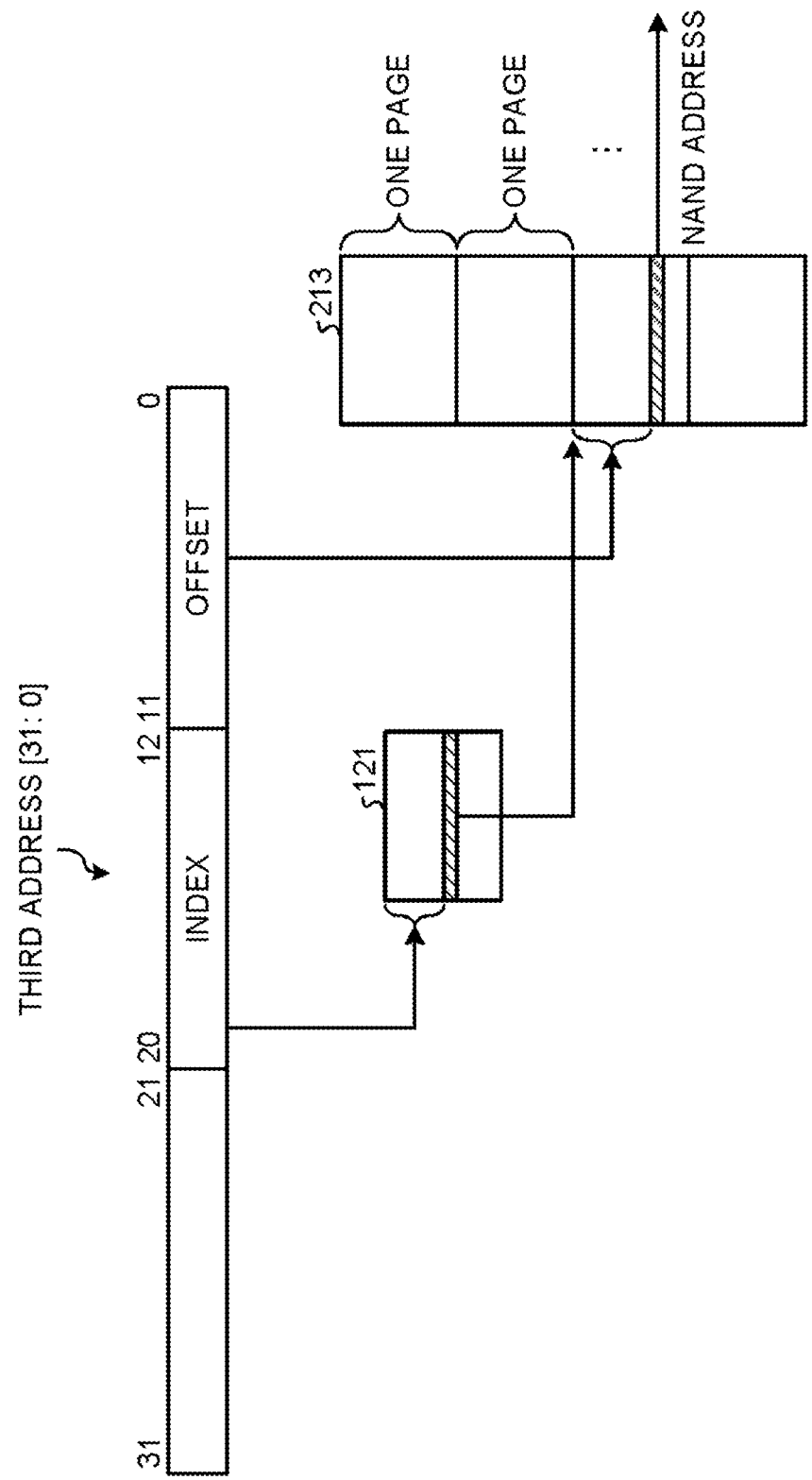
FIG. 4 is a diagram illustrating an example of a relation between a third address and each entry of various tables in the first embodiment.

FIG. 4 is a diagram illustrating an example of the relation between the third address and each entry of various tables in the first embodiment. For example, it is assumed that the unit area of the host memory 21 has a size of 4 Kbyte and the total number of entries in the conversion table 121 is 512. Since 512 unit areas are allocated as the device area 212, the use of the conversion table 121 makes it possible to manage an area with a maximum size of 2 Mbyte. Here, the LSB of the third address is treated as a 0th bit of the third address. A value which is recorded from a 12th bit to a 20th bit of the third address is used as an index for searching the conversion table 121. That is, an entry having, as an entry number, the value which is recorded from the 12th bit to the 20th bit of the third address is searched as the first entry. A value which is recorded from a 0th bit to an 11th bit of the third address is treated as an offset from the second address indicated by the first entry. The second address indicated by the first entry indicates the location of the head of a given page. The second entry is stored at a location that is offset from the head of the page by the value which is recorded from the 0th bit to the 11th bit of the third address.

The conversion unit 113 includes an SRAM 118. The SRAM 118 stores the conversion table 121 received from the processing unit 115. The conversion unit 113 converts the third address obtained by the operation of the processing unit 115 into the second address indicating the location of the second entry, using the third address and the conversion table 121. Then, the conversion unit 113 reads the second entry from the location indicated by the converted second address and transmits the read second entry to the processing unit 115.

That is, the processing unit 115 designates the third address. The conversion unit 113 converts the third address designated by the processing unit 115 into the second address, using the conversion table 121, and accesses the location indicated by the converted second address.

The processing unit 115 acquires the NAND address from the second entry received from the conversion unit 113. The processing unit 115 transmits the second address included in the access command to the data transmission unit 112. In addition, the processing unit 115 transmits the data transmission direction to the data transmission unit 112. The processing unit 115 transmits, to the NAND memory 11 through the NAND I/F 116, a command corresponding to the access command received from the host device 2. The command issued to the NAND memory 11 is referred to as a NAND command in order to be distinguished from the access command from the host device 2. The NAND command includes at least the type of command and a NAND address read from the second entry. The type of command includes a read command and a write command. When the type of NAND command is a read command, the NAND address included in the NAND command indicates the location where data to be read is stored. When the type of NAND command is a write command, the NAND address included in the NAND command indicates the destination of data to be written.

Data that has read from the NAND memory 11 in response to the NAND command, which is a read command, is stored at the location indicated by the second address in the host area 211 by the data transmission unit 112. When the type of NAND command is a write command, data which has been read from the location indicated by the second address in the host area 211 is transmitted to the NAND memory 11 by the data transmission unit 112.

The processing unit 115 updates the translation table 213. For example, the processing unit 115 updates the translation table 213 with the writing of the data transmitted from the host device 2 to the NAND memory 11. For example, the processing unit 115 can perform wear leveling. The wear leveling is a technique which moves data from a cell to which data is rewritten a large number of times to a cell to which data is rewritten a small number of times to equalize the number of times data is rewritten. The processing unit 115 updates the translation table 213, with the movement of data by the wear leveling. In addition, the processing unit 115 can perform garbage collection. The garbage collection means a process which collects only valid data from a plurality of blocks, copies the collected valid data to another block, and deletes the content of the copy source block. The processing unit 115 updates the translation table 213, with the movement of data by the garbage collection. In addition, the processing unit 115 can perform an unmapping process. The unmapping process means a process of dissolving the relation between the first address and the NAND address. The processing unit 115 performs the unmapping process in response to a command from the host device 2. The processing unit 115 updates the translation table 213 according to the unmapping process.

When the memory system 1 is turned off, the translation table 213 is stored in a non-volatile memory (for example, the NAND memory 11). When the memory system 1 starts, the processing unit 115 transmits the translation table 213 from the non-volatile memory to the device area 212. The processing unit 115 transmits at least an updated portion of the translation table 213 from the device area 212 to the non-volatile memory at a certain timing (for example, when the memory system 1 is shut down).

Figure 5:
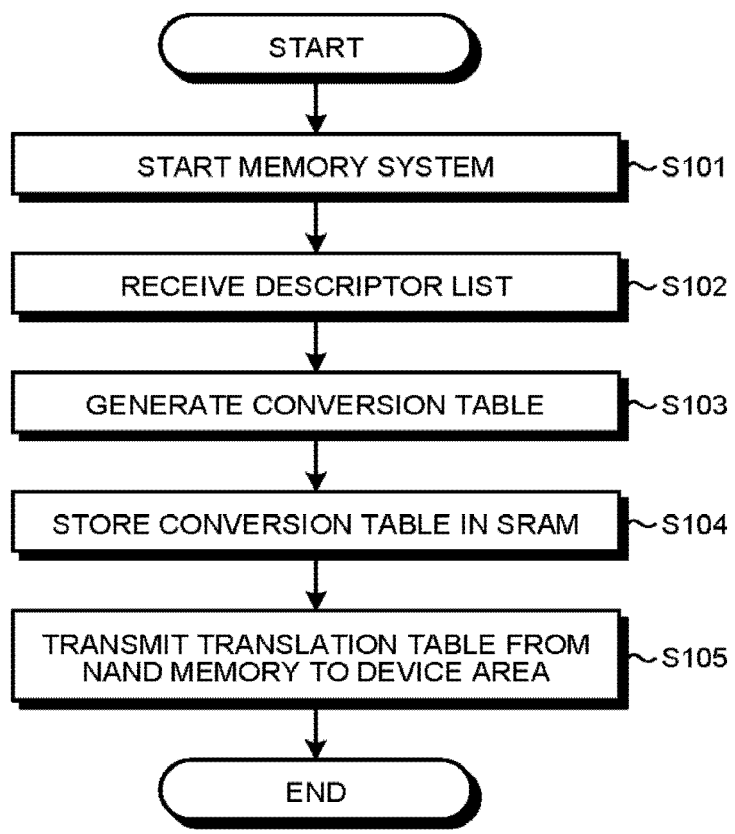
FIG. 5 is a flowchart illustrating the operation of the memory system when the memory system starts.

Next, the operation of the information processing apparatus 3 according to the first embodiment will be described. FIG. 5 is a flowchart illustrating the operation of the memory system 1 when the memory system 1 starts.

The time when the memory system 1 starts includes the time when the operating system of the host device 2 recognizes the memory system 1 after the information processing apparatus 3 connected to the memory system 1 starts. In addition, the time when the memory system 1 starts includes the time when the operating system of the host device 2 recognizes the memory system 1 after the memory system 1 is connected to the host device 2 that is operating.

When the memory system 1 starts (S101), the processing unit 115 receives the descriptor list 300 from the host device 2 (S102). In the host device 2, the host CPU 20 transmits the descriptor list 300 under the control of the operating system. The processing unit 115 generates the conversion table 121 on the basis of the descriptor list 300 (S103).

In S103, for example, first, the processing unit 115 initializes the conversion table 121. For example, the initialization of the conversion table 121 means that the valid flags of all of the entries are set to "0". After initializing the conversion table 121, the processing unit 115 sequentially reads one or more entries of the descriptor list 300 from the top. Whenever reading the entry from the descriptor list 300, the processing unit 115 generates one or more entries of the conversion table 121 and registers the one or more generated entries in the conversion table 121. For example, a case is considered in which "HADDR X" is registered as the second address and "Y" is registered as the size information in the entry read from the descriptor list 300. When Y=1 is satisfied, the processing unit 115 generates an entry in which "HADDR X" is registered as the second address. When Y>1 is satisfied, the processing unit 115 generates "Y" entries corresponding to "Y" pages which are located in the range with a size corresponding to "Y" pages having "HADDR X" at the head. For example, the processing unit 115 generates entries in which "HADDR X", "HADDR X+4 Kbyte", and "HADDR X+8 Kbyte", . . . are registered in this order. When a plurality of entries of the conversion table 121 are generated from one entry of the descriptor list 300, the processing unit 115 generates the plurality of entries of the conversion table 121 in the order of the second addresses. The processing unit 115 registers each of the generated entries in the conversion table 121 in the order of generation. The processing unit 115 sets "1" to the valid flag of the registered entry. The processing unit 115 sets "0" to the valid flag of the entry which has not been registered.

When the process in S103 is performed as described above, the order of one or more pages defined by the descriptor list 300 is the same as the order of one or more pages defined by the conversion table 121.

The processing unit 115 transmits the generated conversion table 121 to the conversion unit 113 and the conversion unit 113 stores the received conversion table 121 in the SRAM 118 (S104). The processing unit 115 transmits the translation table 213 from the NAND memory 11 to the device area 212 (S105) and ends the operation.

The translation table 213 can be transmitted by, for example, the data transmission unit 112. The transmission destination page of the translation table 213 is one or more pages defined by the conversion table 121. The initial transmission destination page of the translation table 213 is a page indicated by the first entry of the conversion table 121. When one page, which is the transmission destination of the translation table 213, is filled up with the entry of the translation table 213, the destination is changed to a page indicated by the next entry of the conversion table 121. When the transmission destination of the translation table 213 is determined in this way, the NAND address corresponding to the first address in the access command is written at the location indicated by the second address which is obtained by the third address and the conversion table 121.

Figure 6:
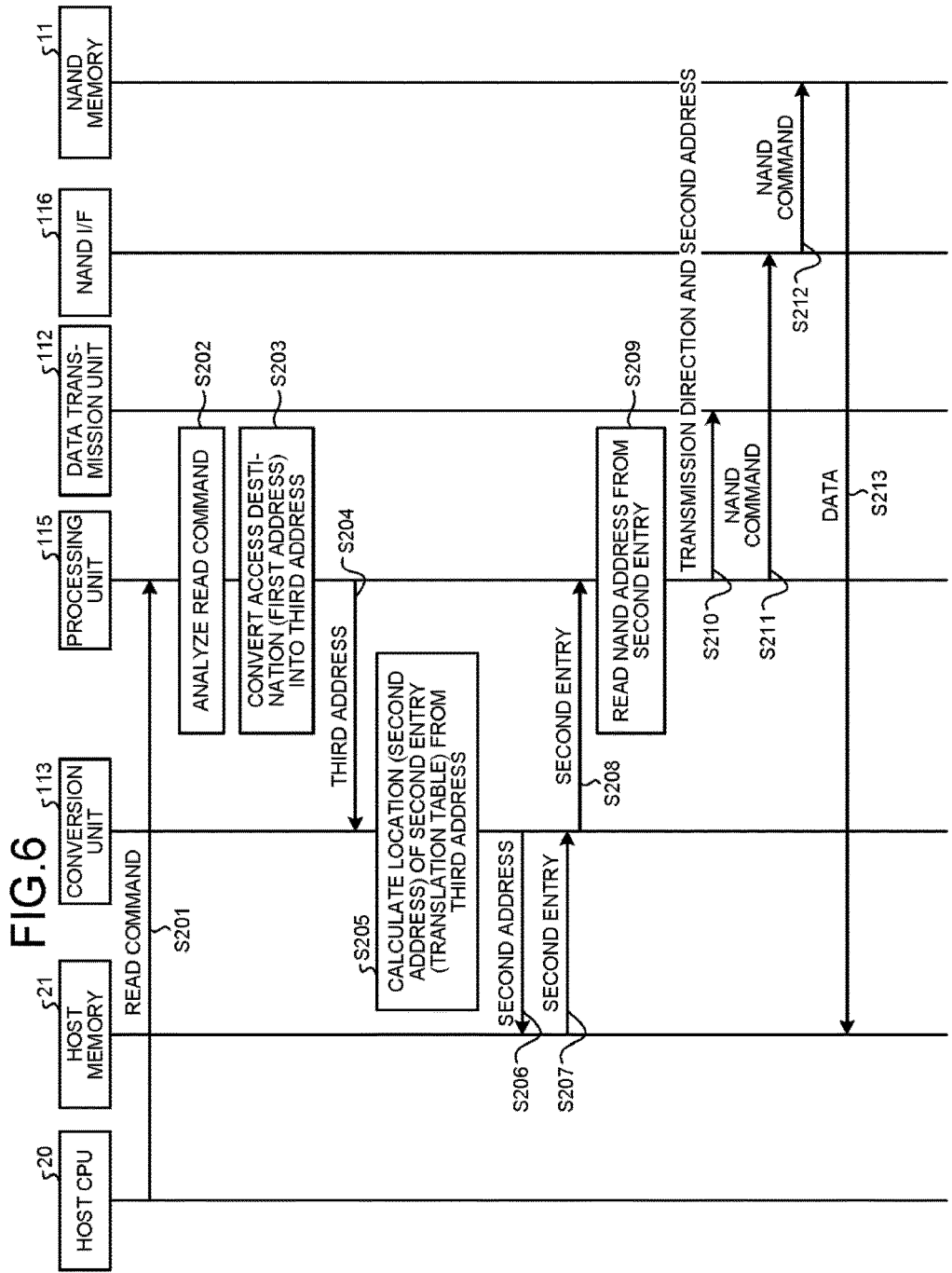
FIG. 6 is a sequence diagram illustrating processing for an access command in the first embodiment.

FIG. 6 is a sequence diagram illustrating processing for the access command in the first embodiment. Here, processing for a read command as an example of the access command will be described. The host CPU 20 issues the read command. The read command is transmitted to the processing unit 115 through the host I/F 111 and the command receiving unit 114 (S201). The read command includes at least the first address designating the location of data to be read, the second address designating the location where the read data is stored in the host area 211, the amount of data to be read, and the type of access. In this example, the type of access is reading.

The processing unit 115 analyzes the read command (S202). That is, for example, the processing unit 115 recognizes that the access type is reading. The processing unit 115 converts the first address included in the read command into the third address (S203). Then, the processing unit 115 transmits the converted third address to the conversion unit 113 (S204).

The conversion unit 113 converts the received third address into the second address indicating the location of the second entry, on the basis of the relationship between the third address and each entry which have been described with reference to FIG. 4 (S205). Then, the conversion unit 113 accesses the location indicated by the converted second address (S206) and reads the second entry (S207). In the process of S206, the conversion unit 113 transmits the converted second address to the host device 2. In the bus of the host device 2, the second address is recognized as an address indicating a location in the device area 212. The conversion unit 113 transmits the read second entry to the processing unit 115 (S208).

The processing unit 115 reads the NAND address from the second entry (S209). Then, the processing unit 115 transmits the data transmission direction and the second address to the data transmission unit 112 (S210). Since the type of access command is a read command, the data transmission direction is from the NAND memory 11 to the host memory 21. In addition, the second address included in the access command is transmitted to the data transmission unit 112.

The processing unit 115 transmits the NAND command to the NAND I/F 116 (S211). The NAND command transmitted in the process of S211 includes at least information indicating that the type of command is a read command and the NAND address read in the process of S209.

The NAND I/F 116 transmits the NAND command to the NAND memory 11 (S212). The NAND memory 11 outputs data in response to the NAND command. The data output from the NAND memory 11 is transmitted to the host memory 21 through the NAND I/F 116 and the host I/F 111, on the basis of the control of the data transmission unit 112 to which the second address and the data transmission direction have been input from the processing unit 115 (S213). Specifically, the data output from the NAND memory 11 is stored at the location indicated by the second address in the host area 211.

The process from S203 to S213 is repeatedly performed until the amount of data which has been transmitted to the host device 2 is equal to the amount of data to be read, which is designated by the access command, which is not illustrated in the drawings for simplicity of description.

In this embodiment, processing for the read command has been described. However, processing for the write command is similar to the processing for the read command except for the transmission direction of data by the data transmission unit 112 and thus the description thereof will not be repeated.

In the above description, the translation table 213 is stored in the device area 212. However, data stored in the device area 212 is not limited to the translation table 213. For example, the processing unit 115 may use the device area 212 as a cache for storing data from the host device 2. In addition, the translation table 213 may be divided into a plurality of layers. A table for converting the NAND address into the first address may be stored in the device area 212. In addition, a microcode forming the firmware 120 may be loaded to the device area 212. The device area 212 may store arbitrary management information which is required for the processing unit 115 to control the memory controller 10. The management information includes, for example, error information or statistical information.

As such, according to the first embodiment, the processing unit 115 designates the third address in the third space. The conversion unit 113 converts the third address designated by the processing unit 115 into the second address indicating a location in the device area 212, using the conversion table 121. The conversion unit 113 transmits the converted second address to the host device 2 to access the device area 212. The conversion table 121 is stored in the SRAM 118 of the memory controller 10. Therefore, the memory system 1 can manage the location in the device area 212 which is allocated in the host memory 21.

The host memory 21 is divided into a plurality of pages. In other words, the host memory 21 includes a plurality of pages. The second address indicating the location of the page is recorded in each entry of the conversion table 121. The third address includes the index for searching each entry of the conversion table 121 and the offset indicating the location with respect to the head of the page. Therefore, the memory controller 10 can convert the third address into the location of the device area 212, using the conversion table 121.

The NAND address corresponding to the first address in the access command is recorded at the location which is offset by a value corresponding to the offset included in the third address from the head of the page indicated by the entry that is searched from the conversion table 121 by the index included in the third address. Therefore, the memory controller 10 does not need to have a memory area for storing the translation table 213.

The memory controller 10 transmits the translation table 213 to the device area 212 when it starts. Specifically, the memory controller 10 transmits the translation table 213 to the device area 212 after receiving the descriptor list 300.

Second Embodiment

It is preferable to minimize the size of the SRAMs (SRAMs 117 and 118) provided in the memory controller 10. In contrast, the size of the translation table 213 tends to increase with an increase in the capacity of the NAND memory 11. When the size of the translation table 213 increases, the size of the conversion table 121 also increases in the first embodiment. In a second embodiment, the conversion table 121 is divided into a plurality of layers in order to solve this problem. A conversion table in the top layer among the conversion tables in the plurality of layers is stored in the memory controller 10 and the other conversion tables are stored in a host memory 21. Therefore, it is possible to cope with a reduction in the size of the SRAMs provided in the memory controller 10 and an increase in the size of the translation table 213. In the second embodiment, for example, the conversion table 121 is divided into tables in two layers (a first conversion table 121*a* and a second conversion table 121*b*).

Figure 7:
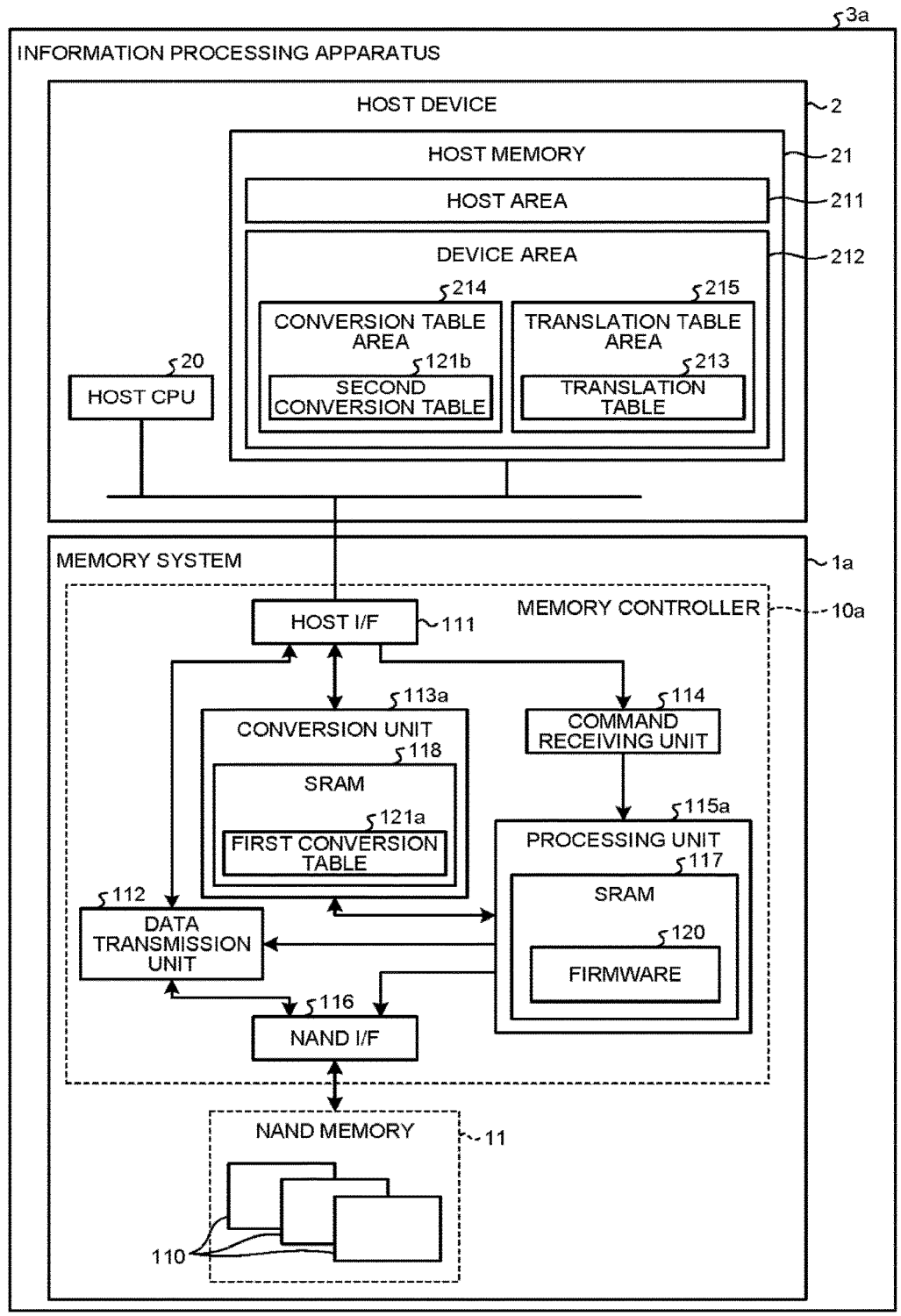
FIG. 7 is a diagram illustrating an example of the structure of a memory system according to a second embodiment.

FIG. 7 is a diagram illustrating an example of the structure of a memory system according to the second embodiment. In the second embodiment, components having the same functions as those in the first embodiment are denoted by the same names and reference numerals as those in the first embodiment. The description of the same components as those in the first embodiment will not be repeated.

A memory system 1*a* is connected to a host device 2. The memory system 1*a* and the host device 2 form an information processing apparatus 3*a* according to the second embodiment. The host device 2 includes a host CPU 20 and a host memory 21. A host area 211 and a device area 212 which can be used by the memory system 1a are allocated in the host memory 21.

The memory system 1a includes a memory controller 10a and a NAND memory 11. The NAND memory 11 includes one or more memory chips 110.

The memory controller 10a includes a host I/F 111, a data transmission unit 112, a conversion unit 113a, a command receiving unit 114, a processing unit 115a, and a NAND I/F 116. Some or all of the host I/F 111, the data transmission unit 112, the conversion unit 113a, the command receiving unit 114, the processing unit 115a, and the NAND I/F 116 can be formed by software, hardware, or a combination thereof. Each of the host I/F 111, the data transmission unit 112, the conversion unit 113a, the command receiving unit 114, the processing unit 115a, and the NAND I/F 116 can be formed by two or more units. Two or more of the host I/F 111, the data transmission unit 112, the conversion unit 113a, the command receiving unit 114, the processing unit 115a, and the NAND I/F 116 can be formed by one unit.

The processing unit 115a generates a first conversion table 121a and a second conversion table 121b on the basis of a descriptor list 300. The first conversion table 121a and the second conversion table 121b have the same data structure as, for example, the conversion table 121 according to the first embodiment. The processing unit 115a transmits the generated first and second conversion tables 121a and 121b to the conversion unit 113a. The conversion unit 113a includes an SRAM 118. The conversion unit 113a stores the first conversion table 121a in the SRAM 118 and stores the second conversion table 121b in the device area 212 of the host memory 21.

The processing unit 115a calculates locational information indicating the location of a third entry among one or more entries in the first conversion table 121a from a first address included in an access command. The location indicated by the third entry is represented by a third address. That is, the processing unit 115a converts the first address into the third address. The third entry indicates the location of the head of the page in which a fourth entry is stored. The fourth entry indicates the location of the head of the page in which a fifth entry among one or more entries of the second conversion table 121b is stored. The fifth entry is an entry, in which a NAND address corresponding to the first address included in the access command is stored, among one or more entries of the translation table 213.

Figure 8:
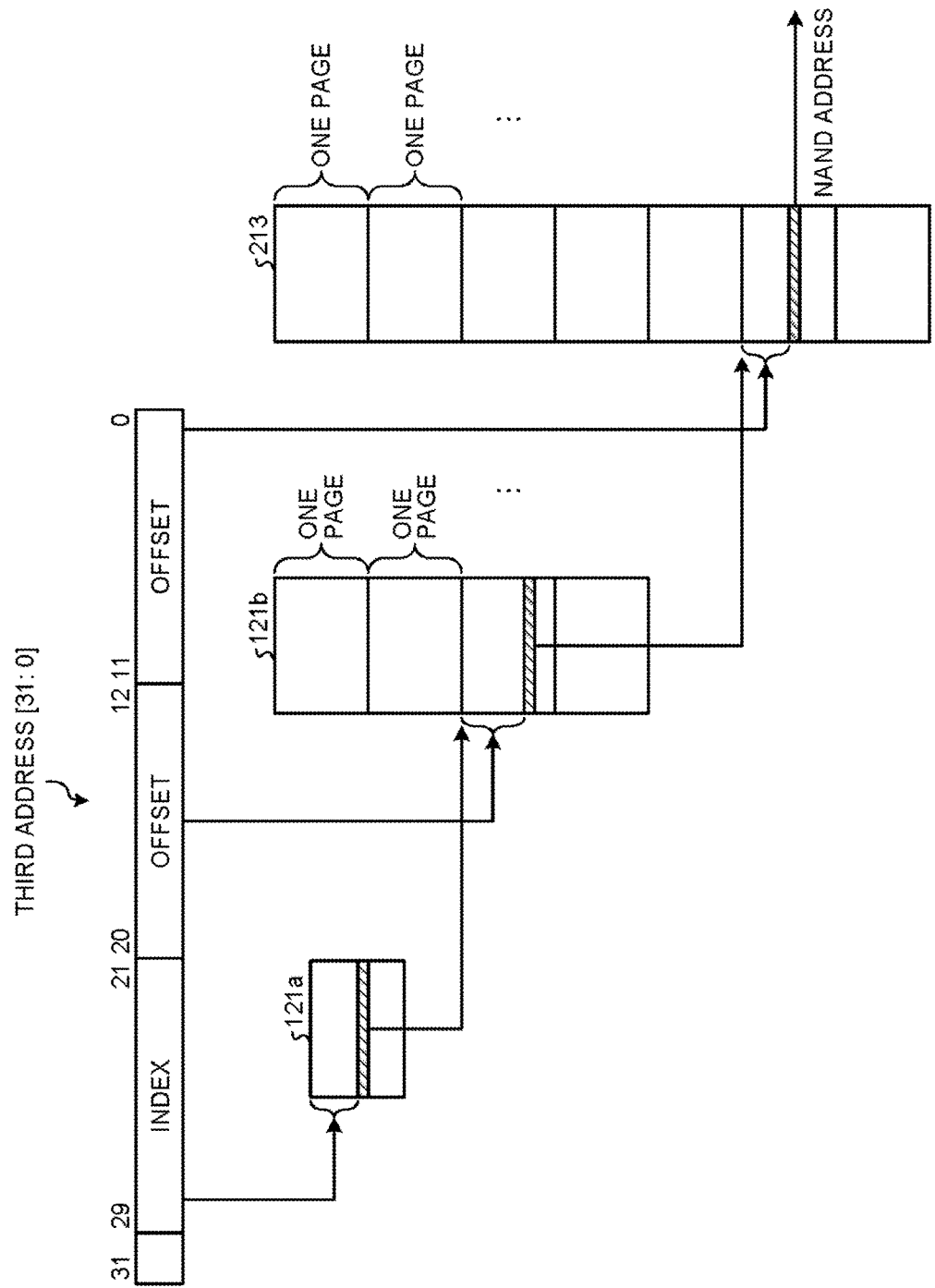
FIG. 8 is a diagram illustrating an example of a relation between a third address and each entry of various tables in the second embodiment.

FIG. 8 is a diagram illustrating an example of the relation between the third address and each entry of various tables in the second embodiment. In this embodiment, for example, it is assumed that the size of a unit area of the host memory 21 is 4 Kbyte and the total number of entries in the first conversion table 121a is 512. One or more entries in the first conversion table 121a each indicate the location of the head of one page. Therefore, the size of the second conversion table 121b is 2 Mbyte.

It is assumed that a second space is a 64-bit space. Therefore, the size of each of the one or more entries in the second conversion table 121b is 8 byte. Since the size of the second conversion table 121b is 2 Mbyte and the size of each entry is 8 byte, the second conversion table 121b can include 256K entries. Since each entry of the second conversion table 121b indicates the location of the head of one page, the use of the second conversion table 121b makes it possible to manage an area with a maximum size of 1 Gbyte.

A value which is recorded from a 21st bit to a 29th bit of the third address is used as an index for searching the first conversion table 121a. That is, an entry having, as an entry number, the value which is recorded from the 21st bit to the 29th bit of the third address is searched as the third entry. A value which is recorded from a 12th bit to a 20th bit of the third address is treated as an offset from the second address indicated by the third entry. The second address indicated by the third entry indicates the location of the head of a given page in which the second conversion table 121b is stored. The fourth entry is stored at a location that is offset from the head of the page by the value which is recorded from the 12th bit to the 20th bit of the third address.

A value which is recorded from a 0th bit to an 11th bit of the third address is treated as an offset from the second address indicated by the fourth entry. The second address indicated by the fourth entry indicates the location of the head of a given page in which the translation table 213 is stored. A fifth entry is stored at a location that is offset from the head of the page by the value which is recorded from the 0th bit to the 11th bit of the third address.

Figure 9:
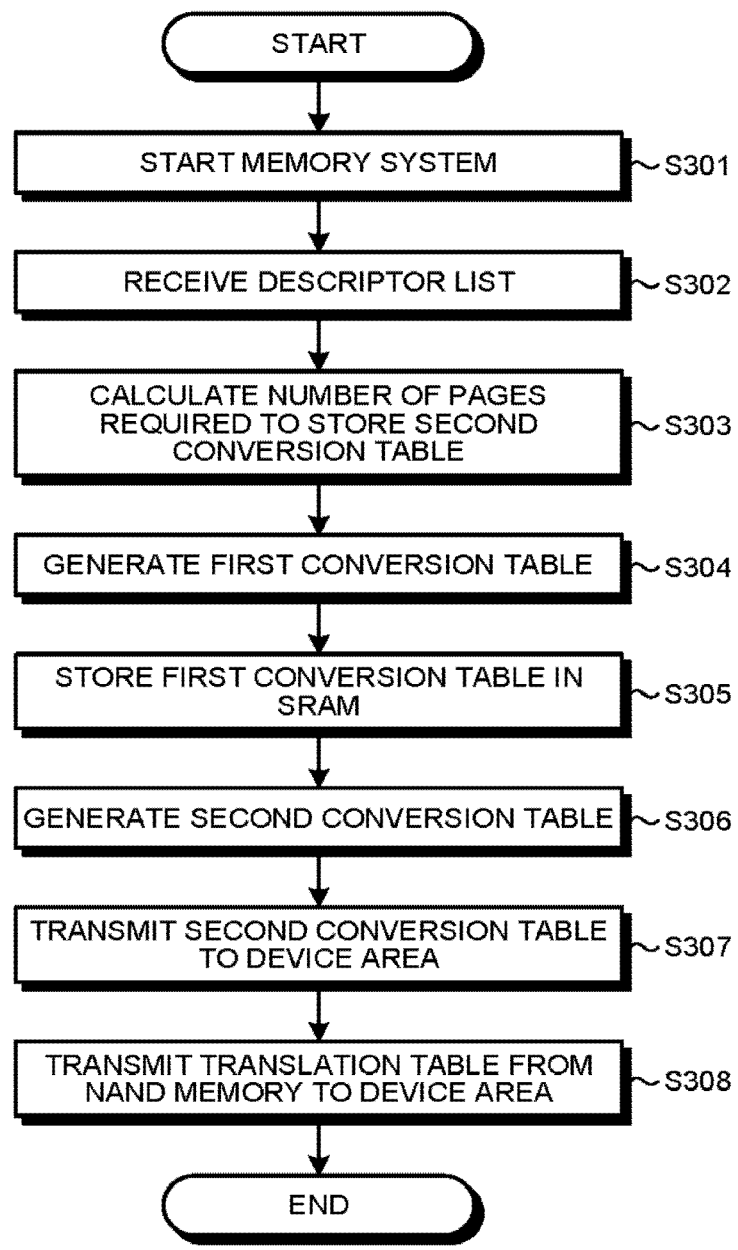
FIG. 9 is a flowchart illustrating the operation of the memory system when the memory system starts.

Next, the operation of the information processing apparatus 3a according to the second embodiment will be described. FIG. 9 is a flowchart illustrating the operation of the memory system 1a when the memory system 1a starts.

When the memory system 1a starts (S301), the processing unit 115a receives the descriptor list 300 from the host device 2 (S302). The processing unit 115a calculates the number of pages required to store the second conversion table 121b on the basis of the total size of the allocated device area 212 (S303).

For example, size information which is recorded in each entry of the descriptor list 300 can be integrated to calculate the total size of the allocated device area 212. In addition, the total size of the allocated device area 212 may be notified from the host device 2, separately from the descriptor list 300. The total size of the allocated device area 212 is referred to as a host memory buffer size (HSIZE). In this embodiment, for example, it is assumed that the unit of the HSIZE is the number of pages. In addition, it is assumed that the size of one page is 4 Kbyte. The size of one page may be notified from the host device 2, separately from the descriptor list 300.

It is assumed that the second space is a 64-bit space. The size of an area required to store the second conversion table 121b is HSIZE*8 byte. Therefore, the number of pages required to store the second conversion table 121b is HSIZE*8 byte/4 Kbyte. However, digits after a decimal point are rounded up. One page can store 4 Kbyte/8 byte (=512) entries (entries of the second conversion table 121b).

After the process in S303, the processing unit 115a generates the first conversion table 121a (S304).

For example, it is assumed that the number of pages required to store the second conversion table 121b is "m". In addition, it is assumed that the second conversion table 121b is stored at the head of the areas which are virtually connected by the descriptor list 300. The processing unit 115a registers, in the first conversion table 121a, the second address indicating the location of the head of each of m pages from the head among one or more pages which are virtually connected by the descriptor list 300. The first conversion table 121a has m entries registered therein. In addition, m pages from the head among one or more pages which are virtually connected by the descriptor list 300 are referred to as a conversion table area 214. The translation table 213 is stored in an area other than the conversion table area 214 among one or more pages which are virtually connected by the descriptor list 300. The area other than the conversion table area 214 among one or more pages which are virtually connected by the descriptor list 300 is referred to as a translation table area 215. In addition, the location of the conversion table area 214 may not be the head of one or more pages which are virtually connected by the descriptor list 300.

The processing unit 115*a* transmits the generated first conversion table 121*a* to the conversion unit 113*a* and the conversion unit 113*a* stores the received first conversion table 121*a* in the SRAM 118 (S305).

The processing unit 115*a* generates the second conversion table 121*b* (S306). The processing unit 115*a* sequentially registers, in the second conversion table 121*b*, the second addresses indicating the heads of all of the pages forming the translation table area 215 among one or more pages which are virtually connected by the descriptor list 300.

The processing unit 115*a* sequentially transmits the generated second conversion table 121*b* to the conversion unit 113*a* from the top and the conversion unit 113*a* sequentially transmits the received second conversion table 121*b* to the device area 212 (S307). In the process of S307, the conversion unit 113*a* stores the first entry of the second conversion table 121*b* in the first page of the conversion table area 214. When one destination page is filled up with the entry of the second conversion table 121*b*, the conversion unit 113*a* changes a storage destination to a page indicated by the next entry of the first conversion table 121*a*. The processing unit 115*a* transmits the translation table 213 from the NAND memory 11 to the device area 212 (S308) and ends the operation.

The translation table 213 can be transmitted by, for example, the data transmission unit 112. The transmission destination page of the translation table 213 is one or more pages defined by the conversion table 121*b*. The first transmission destination page of the translation table 213 is a page indicated by the first entry of the second conversion table 121*b*. When one page, which is the transmission destination of the translation table 213, is filled up with the entry of the translation table 213, the destination is changed to a page indicated by the next entry of the second conversion table 121*b*. When the transmission destination of the translation table 213 is determined in this way, the NAND address corresponding to the first address in the access command is written at the location indicated by the second address which is obtained by the third address, the first conversion table 121*a*, and the second conversion table 121*b*.

A case in which the processing unit 115*a* receives the descriptor list 300 illustrated in FIG. 10 is considered. It is assumed that a total of 700 pages are defined as the device area 212 by the descriptor list 300 illustrated in FIG. 10. That is, HSIZE is 700. In addition, it is assumed that the third page from the location indicated by "HADDR 35" corresponds to the 512th page from the head of the area including 700 pages which are virtually connected by the descriptor list 300.

In the case of the descriptor list 300 illustrated in FIG. 10, the processing unit 115*a* calculates HSIZE*8 byte/4 Kbyte in the process of S303. Since the calculated value is "1.37", the number of pages required to store the second conversion table 121*b* is "2". The memory system 1*a* uses, as the conversion table area 214, two pages from the head of the area including 700 pages which are virtually connected by the descriptor list 300. The processing unit 115*a* registers a page which is located at "HADDR 0" and a page which is located at "HADDR 1" in the first conversion table 121*a* in this order. The first conversion table 121*a* illustrated in FIG. 11 is completed. The memory system 1*a* uses, as the translation table area 215, pages from the third page to the 700th page. The processing unit 115*a* registers the pages from the third page to the 700th page from the head of the area including 700 pages which are virtually connected by the descriptor list 300 in the second conversion table 121*b* in this order. The second conversion table 121*b* illustrated in FIG. 12 is completed. In addition, among 698 entries of the second conversion table 121*b* illustrated in FIG. 12, entries with entry numbers "0" to "511" are sequentially stored from the head of a page, which is located at "HADDR 0", of two pages defined by the first conversion table 121*a*. Among 698 entries of the second conversion table 121*b* illustrated in FIG. 12, entries with entry numbers "512" to "698" are sequentially stored from the head of a page, which is located at "HADDR 1", of the two pages defined by the first conversion table 121*a*.

FIG. 13 is a sequence diagram illustrating processing for the access command in the second embodiment. The host CPU 20 issues a read command. The read command is transmitted to the processing unit 115*a* through the host I/F 111 and the command receiving unit 114 (S401). The read command includes at least the first address designating the location of data to be read, the second address designating the location where the read data is stored in the host area 211, the amount of data to be read, and the type of access. In this example, the type of access is reading.

The processing unit 115*a* analyzes the read command (S402). That is, for example, the processing unit 115*a* converts the first address included in the read command into the third address (S403). Then, the processing unit 115*a* transmits the converted third address to the conversion unit 113*a* (S404).

The conversion unit 113*a* converts the received third address into a second address indicating the location of the fourth entry among one or more entries of the second conversion table 121*b*, on the basis of the relationship between the third address and each entry which have been described with reference to FIG. 8 (S405). Then, the conversion unit 113*a* accesses the location indicated by the converted second address (S406) and reads the fourth entry (S407). In the process of S406, the conversion unit 113*a* transmits the converted second address to the host device 2. In the bus of the host device 2, the second address is recognized as an address indicating a location in the device area 212.

The conversion unit 113*a* converts the fourth entry into the second address indicating the location of the fifth entry among one or more entries of the translation table 213, on the basis of the third address and the second address registered in the received fourth entry, using the relationship between the third address and each entry which have been described with reference to FIG. 8 (S408). Then, the conversion unit 113*a* accesses the location indicated by the converted second address (S409) and reads the fifth entry (S410). The conversion unit 113*a* transmits the read fifth entry to the processing unit 115*a* (S411).

The processing unit 115*a* reads the NAND address from the fifth entry (S412). Then, a process in S413 to S416 is the same as the process in S210 to S213.

The process from S403 to S416 is repeatedly performed until the amount of data which has been transmitted to the host device 2 is equal to the amount of data to be read, which is designated by the access command.

In the above description, the conversion table 121 is divided into two layers. However, the conversion table 121 may be divided into three or more layers. When the conversion table 121 is divided into three or more layers, the conversion table in the top layer is stored in the SRAM 118 and the conversion tables in the other layers are stored in the conversion table area 214.

As such, according to the second embodiment, the conversion table 121 is divided into a plurality of layers. The first conversion table 121a, which is a conversion table in the top layer, is stored in the SRAM 118 of the memory controller 10. The second conversion table 121b, which is a conversion table in a layer below the top layer, is stored in the conversion table area 214 of the host memory 21. Therefore, even when the size of the NAND memory 11 increases, it is possible to suppress an increase in the size of the SRAM provided in the memory controller 10a.

The host device 2 transmits the descriptor list 300 when the memory system 1a starts. The processing unit 115a determines the conversion table area 214 for storing the second conversion table 121b from the areas notified by the descriptor list 300. Therefore, the memory system 1a can use the device area 212 only by receiving the descriptor list 300 from the host device 2.

The memory controller 10a stores the second conversion table 121b in the host memory 21 according to the descriptor list 300 when it starts. In addition, the memory controller 10a stores the translation table 213 in the host memory 21 according to the descriptor list 300 when it starts.

The host memory 21 is managed for each page. That is, the host memory 21 is divided into a plurality of pages. The third address includes an index indicating the location of one page among one or more pages stored in the second conversion table 121b and an offset (first offset) from the head of the page. The conversion unit 113a reads the third entry among one or more entries of the second conversion table 121b from the location that is offset from the head of the page indicated by the index included in the third address by a value corresponding to the first offset included in the third address.

The second address indicating the location of one page among one or more pages in which the translation table 213 is stored is recorded in the third entry. In addition, the third address further includes an offset (second offset) from the head of the page which is indicated by the second address recorded in the third entry. The conversion unit 113a accesses the location that is offset from the head of the page indicated by the second address recorded in the third entry by a value corresponding to the second offset included in the third address. Therefore, the memory system 1a can manage a location in the device area 212, using the conversion table 121 divided into a plurality of layers.

In addition, the NAND address is recorded at the location that is offset from the head of the page indicated by the second address recorded in the third entry by a value corresponding to the second offset included in the third address. The conversion unit 113a reads the NAND address. The memory system 1a can use the device area 212 as an area for storing the translation table 213.

Third Embodiment

For example, when the size of one page is 8 Kbyte and a conversion table 121 is divided into two layers, a value which is recorded from a 23rd bit to a 31st bit of a third address corresponds to an index for searching a first conversion table 121a. In addition, a value which is recorded from a 13th bit to a 22nd bit of the third address corresponds to an offset (an offset from the head of a page in which a second conversion table 121b is stored) for searching the second conversion table 121b. A value which is recorded from a 0th bit to a 12th bit of the third address corresponds to an offset (an offset from the head of a page in which a translation table 213 is stored) for searching the translation table 213.

In the above-described first and second embodiments, the size of one page is 4 Kbyte. However, as described above, the size of one page may not be 4 Kbyte. The size of one page may have any value corresponding to the power of 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host device including a first memory, comprising:
 a second memory in which data from the host device is stored, the second memory being a non-volatile memory; and
 a memory controller that includes a third memory which is a volatile memory, controls the second memory and the third memory, and has a first space,
 wherein the memory controller includes:
 a first unit that designates a first address which is an address in the first space; and
 a second unit that converts, by using a conversion table, the first address into a second address indicating a location in a first area of the first memory, and transmits the second address to the host device to access the first area, wherein
 the conversion table includes a plurality of layers and includes a first conversion table which is a table in a top layer of the plurality of layers and a second conversion table which is a table in a layer of the plurality of layers lower than the top layer,
 the first conversion table is stored in the third memory, and
 the second conversion table is stored in a second area of the first memory, wherein
 the first memory includes a plurality of pages,
 each of the plurality of pages is a unit area with a fixed size,
 the first conversion table includes a plurality of entries,
 each of the plurality of entries indicates one page among the plurality of pages, wherein
 when the memory system starts, the memory system receives a descriptor list from the host device,
 each entry of the descriptor list includes a third address indicating a location in a third area of the first memory and size information of the third area,
 the size information included in each entry of the descriptor list is represented by a number of one or more pages whose locations are continuous, the third area being an area used by the memory system,
 the memory controller further includes a third unit that determines the first area and the second area in the third area, and
 the memory system generates the first conversion table and the second conversion table on the basis of the descriptor list.

2. The memory system according to claim 1,
wherein, when the memory controller generates the second conversion table, the memory controller stores the second conversion table in the first area.

3. The memory system according to claim 1,
wherein when the memory system receives the descriptor list from the host device, the memory controller stores a translation table, in which a location in the second memory is associated with a fourth address that is used by the host device, in the second area.

4. The memory system according to claim 1,
wherein
the first conversion table includes a first entry in which a location of a head of a first page among the plurality of pages is described,
the first page is included in the first area, and
the first address includes at least an index for searching the first entry and a first offset from the location of the head of the first page.

5. The memory system according to claim 4,
wherein the plurality of layers are two layers,
in the second conversion table, a second entry in which a location of a head of a second page among the plurality of pages is described is stored at a location that is offset from the head of the first page by the first offset,
the second page is included in the second area, and
the first address further includes a second offset from the location of the head of the second page.

6. The memory system according to claim 5,
wherein the memory controller records a physical location in the second memory corresponding to a fourth address which is used by the host device at a location that is offset from the location of the head of the second page by the second offset.

7. The memory system according to claim 1,
wherein, in the host device, the first memory is mapped to a second space, and
the second address is locational information which belongs to the second space.

8. An information processing apparatus comprising:
a host device that includes a first memory; and
a memory system including a second memory in which data from the host device is stored and a memory controller that includes a third memory, controls the second memory and the third memory, and has a first space, the second memory being a non-volatile memory, the third memory being a volatile memory,
wherein the memory controller includes:
a first unit that designates a first address which is an address in the first space; and
a second unit that converts, by using a conversion table, the first address into a second address indicating a location in a first area of the first memory, and transmits the second address to the host device to access the first area, wherein
the conversion table includes a plurality of layers and includes a first conversion table which is a table in a top layer of the plurality of layers and a second conversion table which is a table in a layer of the plurality of layers lower than the top layer,
the first conversion table is stored in the third memory, and
the second conversion table is stored in a second area of the first memory, wherein
the first memory includes a plurality of pages,
each of the plurality of pages is a unit area with a fixed size,
the first conversion table includes a plurality of entries,
each of the plurality of entries indicates one page among the plurality of pages,
when the memory system starts, the memory system receives a descriptor list from the host device,
each entry of the descriptor list includes a third address indicating a location in a third area of the first memory and size information of the third area,
the size information included in each entry of the descriptor list is represented by a number of one or more pages whose locations are continuous,
the third area being an area used by the memory system,
the memory controller further includes a third unit that determines the first area and the second area from the third area, and
the memory system generates the first conversion table and the second conversion table on the basis of the descriptor list.

9. The information processing apparatus according to claim 8,
wherein, when the memory controller generates the second conversion table, the memory controller stores the second conversion table in the first area.

10. The information processing apparatus according to claim 8,
wherein the host device transmits a fourth address to the memory system to access the memory system, and
when the memory system receives a descriptor list from the host device, the memory controller stores a translation table, in which a location in the second memory is associated with the fourth address, in the second area.

11. The information processing apparatus according to claim 8,
wherein the first conversion table includes a first entry in which a location of a head of a first page among the plurality of pages is described,
the first page is included in the first area, and
the first address includes at least an index for searching the first entry and a first offset from the location of the head of the first page.

12. The information processing apparatus according to claim 11,
wherein the plurality of layers are two layers,
in the second conversion table, a second entry in which a location of a head of a second page among the plurality of pages is described is stored at a location that is offset from the head of the first page by the first offset,
the second page is included in the second area, and
the first address further includes a second offset from the location of the head of the second page.

13. The information processing apparatus according to claim 12,
wherein the host device transmits a fourth address to the memory system to access the memory system, and
the memory controller records a physical location in the second memory which corresponds to the fourth address at a location that is offset from the location of the head of the second page by the second offset.

14. The information processing apparatus according to claim 8,
wherein, in the host device, the first memory is mapped to a second space, and
the second address is locational information which belongs to the second space.

15. A memory system connectable to a host device including a first memory, comprising:
- a second memory in which data from the host device is stored, the second memory being a non-volatile memory; and
- a memory controller that performs data transmission between the host device and the second memory and has a first space,
- wherein the memory controller includes:
- a first unit that designates a first address which is an address in the first space;
- a second unit that converts, by using a conversion table, the first address into a second address indicating a location in a first area of the first memory, and transmits the second address to the host device to access the first area; and
- a third memory that stores the conversion table, wherein the first memory includes a plurality of pages,
- each of the plurality of pages is a unit area with a fixed size,
- the first conversion table includes a plurality of entries,
- each of the plurality of entries indicates one page among the plurality of pages, wherein
- when the memory system starts, the memory system receives a descriptor list from the host device,
- each entry of the descriptor list includes a third address indicating a location in a third area of the first memory and size information of the third area,
- the size information included in each entry of the descriptor list is represented by a number of one or more pages whose locations are continuous, the third area being an area used by the memory system,
- the memory controller further includes a third unit that determines the first area and the second area from the third area, and
- the memory system generates the first conversion table and the second conversion table on the basis of the descriptor list.

16. The memory system according to claim 15,
wherein the conversion table includes a first entry in which a location of a head of a first page among the plurality of pages is described,
the first page is included in the first area, and
the first address includes at least an index for searching the first entry and an offset from the location of the head of the first page.

17. The memory system according to claim 16,
wherein the host device transmits a fourth address to the memory system to access the memory system, and
the memory controller records a location in the first memory which corresponds to the fourth address at a location that is offset from the location of the head of the first page by the offset.

18. The memory system according to claim 17,
wherein
the memory controller records the location in the first memory which corresponds to the fourth address at the location that is offset from the location of the head of the first page by the offset when the first area is notified.

* * * * *